United States Patent Office 2,946,675
Patented July 26, 1960

2,946,675

SAWDUST COMPOSTS AND METHOD OF PREPARING THE SAME

Charles B. Davey and Sergei A. Wilde, Madison, Wis., assignors to Wisconsin Alumni Research Foundation, Madison, Wis., a corporation of Wisconsin No Drawing. Filed Apr. 21, 1954, Ser. No. 424,775

3 Claims. (Cl. 71—8)

The present invention relates to a novel product and particularly sawdust composts and the improved method of preparing the same.

Sawdust is a by-product of wood-using industries obtained in vast quantities. For many years its utilization has presented a problem. In recent times, some market has been found in nurseries and truck gardens which use sawdust largely as top dressing. However, the insufficient outlet and the not always satisfactory results achieved with plant growth prompted repeated efforts to find more effective ways for the utilization of sawdust and related wood remains. These efforts are particularly justified because of the progressive depletion of soil organic matter by cultivation, burning of organic residues, and processes of erosion. Allison, F. E., and Anderson, M. S., Div. Soil Mgmt. and Irrig., A.R.A., B.P.I.S.A.E., Beltsville, Md. (1951); Walters, C. S., Fox, H. W., and Wycoff, H. R., Jour. of For., 49: 910 (1951). See also Lunt, H. A., Northeastern Wood Util. Council Bul., 33 (1950).

From the nutritional standpoint, the major shortcoming of sawdust is its high carbon-nitrogen ratio and subsequent fixation of nitrogen by cellulose-decomposition organisms. Waksman, S. A., Humus, Ed. 2. Baltimore: Williams & Wilkins Co. (1938). In some instances the growth depressing effect may also be amplified by tannins and other organo-solubles present in certain types of sawdust.

During our investigations in this field we discovered a method for the relatively rapid decomposition of sawdust involving treatment with substantially anhydrous ammonia, neutralization with phosphoric acid, and inoculation with a certain wood-destroying fungus. The resulting product was found to be a highly desirable sawdust compost enriched in base-absorbing lignin and lignin-like compounds free from the disadvantages referred to above in connection with the use of sawdust.

The sawdust used in the present invention can be obtained from various types of wood. Oak, basswood, maple, white pine, birch, aspen and the like are illustrative examples. In the first step of the process, the sawdust is treated with anhydrous ammonia. The resulting ammonia gas penetrates the sawdust and chemical reactions take place. This treatment, coupled with neutralization with phosphoric acid, has been found to be essential as it conditions the wood so as to make it vulnerable to attack by the organism specified below. Various amounts of ammonia can be employed with a range of about 12–18 pounds of $NH_3$ per cubic yard or 300–400 pounds of air dry sawdust being preferred. In our investigations we have found that about 15 pounds of ammonia per cubic yard of sawdust can be advantageously used with maple sawdust, that slightly more ammonia can advantageously be used with oak sawdust and that slightly less ammonia can be advantageously used with aspen sawdust. The optimum amount of ammonia to be used with any particular sawdust can be readily ascertained by experimental test. The sawdust after the ammonia treatment has a pH of about 10 or above.

To the ammonia treated sawdust is then preferably added about 1 to 6 pounds of potassium sulfate or like suitable potassium salt per cubic yard of sawdust. The optimum amount will vary, depending on the exchange capacity of the sawdust, but in our investigations we have found the use of about 5 pounds of potassium sulfate (50% $K_2O$) per cubic yard of sawdust to be generally adequate and satisfactory. Small amounts of trace element fertilizers such as copper sulfate, zinc sulfate, manganese sulfate, borax and the like can also be added if desired. The potash in the final compost is in exchangeable form available to plants but is "fixed" in that it is not readily removed by water, e.g., rain.

The treated (alkaline) sawdust is next neutralized with phosphoric acid to bring the pH down to about 6.1 to 6.9 and preferably about 6.5. The pH should be brought down below 7 in order to hold or bind the ammonia or ammonia reaction products. Relatively highly acidic conditions should be avoided as the organism does not grow well below pH 5.5.

The neutralized sawdust is then inoculated with the organism Coprinus ephemerus, e.g., 1% by volume of a product cultured in decayed wood, and the resulting mixture allowed to undergo aerobic fermentation. The sawdust should be kept moist during fermentation by application of water. Also to aid fermentation and resulting disintegration, the sawdust is preferably reworked several times during the fermentation period. The time required to form the desired compost may vary from two months to a full growing season, depending on the climate under which the fermentation is taking place. With moist warm temperatures or under greenhouse conditions fermentation may be completed within six or seven weeks. In large-scale operations fermentation can advantageously be carried out in an open concrete pit provided with a sump for recycling water to keep the fermenting sawdust moist.

The following detailed example will serve to illustrate the invention:

*Example*

Fresh maple sawdust is first thoroughly mixed with anhydrous ammonia in a ratio of about 15 pounds of ammonia per cubic yard of sawdust. After this treatment the pH of the sawdust is about 12.5. The treated sawdust is allowed to stand for about ten days. Potassium sulfate is next added in a ratio of five pounds of potassium sulfate (50% $K_2O$) per cubic yard of sawdust. The sawdust is then neutralized by addition of two pounds of 85 percent phosphoric acid per cubic yard of sawdust. The acid is preferably diluted with water (e.g. eight gallons of water with two pounds of 85 percent phosphoric acid) to facilitate a more uniform distribution. After about another ten-day period, the material is inoculated with Coprinus ephemerus, cultured in decayed wood. The compost mixture is then allowed to ferment for about three months with occasional reworking and watering. The final product has a microaggregate structure and strongly resembles a rich, mull-like soil in appearance. Aeration or aeration with heat exchange can be employed if desired to enhance fermentation.

The sawdust composts prepared in accordance with the present invention are characterized by relatively large amounts of available nitrogen, phosphorus and potassium. In practice they have been found to have a growth stimulating effect of the type desired and to be free from the strong growth depressing effect of fresh sawdust. The composts can be used as such or be mixed with commercial fertilizers where the soil being worked requires additional nutrients.

It is claimed:

1. The process of preparing a sawdust compost which comprises reacting sawdust with anhydrous ammonia in a ratio of about 12–18 pounds of ammonia per cubic yard of sawdust, mixing the resulting alkaline sawdust product with about 1 to 6 pounds of potassium sulfate per cubic yard of sawdust, neutralizing the sawdust mixture with phosphoric acid to provide a sawdust product with a pH of about 6.1 to 6.9, inoculating the neutralized sawdust product with *Coprinus ephemerus* and allowing the resulting mixture to ferment while maintaining the sawdust moist.

2. The process of preparing a sawdust compost free from the growth depressing effects of fresh sawdust, which comprises reacting sawdust with anhydrous ammonia in a ratio of about 15 pounds of ammonia per cubic yard of sawdust, mixing the resulting alkaline sawdust product with about 5 pounds of potassium sulfate (50% $K_2O$) per cubic yard of sawdust, neutralizing the sawdust mixture with phosphoric acid to provide a sawdust product with a pH of about 6.5, inoculating the neutralized sawdust product with *Coprinus ephemerus* cultured in decayed wood, and allowing the resulting mixture to ferment for several months with occasional reworking and while maintaining the sawdust moist.

3. The process of preparing a sawdust compost which comprises reacting sawdust with sufficient anhydrous ammonia to provide a sawdust product with a pH of at least about 10, neutralizing the sawdust mixture with phosphoric acid to provide a sawdust product with a pH of about 6.1 to 6.9, inoculating the neutralized sawdust product with *Coprinus ephemerus* and allowing the resulting mixture to ferment while maintaining the sawdust moist.

References Cited in the file of this patent

UNITED STATES PATENTS

| | | |
|---|---|---|
| 847,749 | Ellis | Mar. 19, 1907 |
| 1,191,615 | Ross et al. | July 18, 1916 |
| 1,736,553 | Singleton et al. | Nov. 19, 1929 |
| 1,832,593 | Szucs | Nov. 17, 1931 |
| 1,933,445 | Murdock | Oct. 31, 1933 |
| 1,938,647 | Earp-Thomas | Dec. 12, 1933 |
| 2,004,706 | Nuske | June 11, 1935 |
| 2,027,766 | Davis et al. | Jan. 14, 1936 |
| 2,150,164 | Heath et al. | Mar. 15, 1939 |
| 2,574,027 | Farber | Nov. 6, 1951 |

OTHER REFERENCES

Plant Physiology "Preparation of Synthetic Composts for Mushroom Culture," July 1943, pages 397–414.

Economic Botany, vol. 8, No. 1, Jan.–Mar. 1954, "Principle and Practice of Mushroom Culture," B. B. Stollen, pages 48–95.